Jan. 28, 1941.   J. ROBINSON   2,229,902
AUTOMATIC TRAIN PIPE CONNECTOR AND CAR COUPLER SLACK CONTROL MEANS
Original Filed April 9, 1935   3 Sheets-Sheet 2
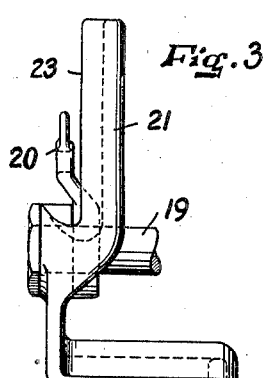
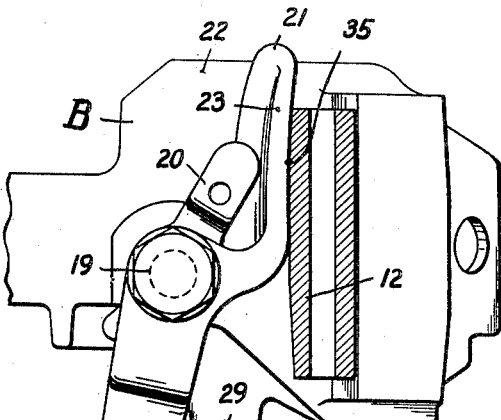
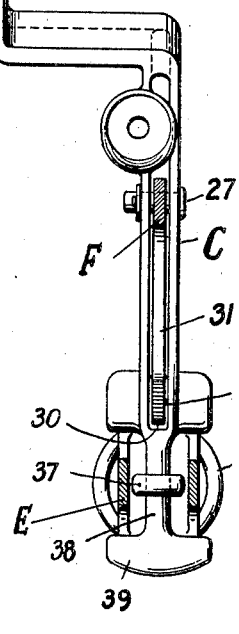
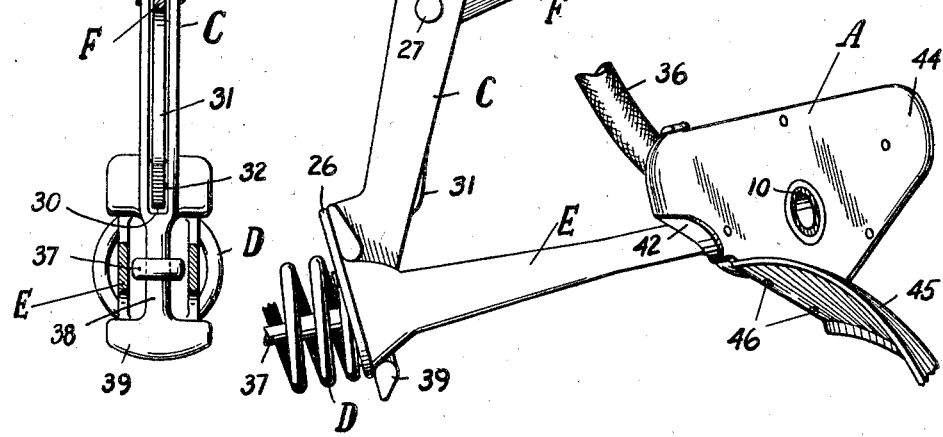
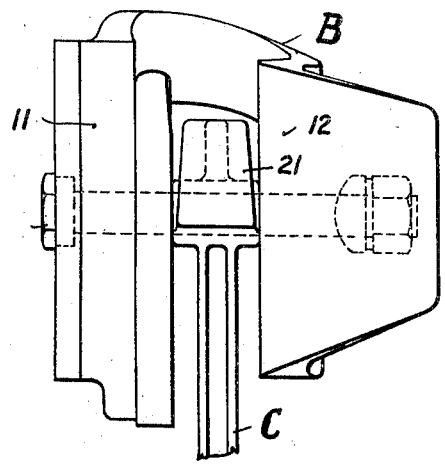
Inventor
JOSEPH ROBINSON
Robb & Robb
Attorneys Jan. 28, 1941.    J. ROBINSON    2,229,902
AUTOMATIC TRAIN PIPE CONNECTOR AND CAR COUPLER SLACK CONTROL MEANS
Original Filed April 9, 1935    3 Sheets-Sheet 3
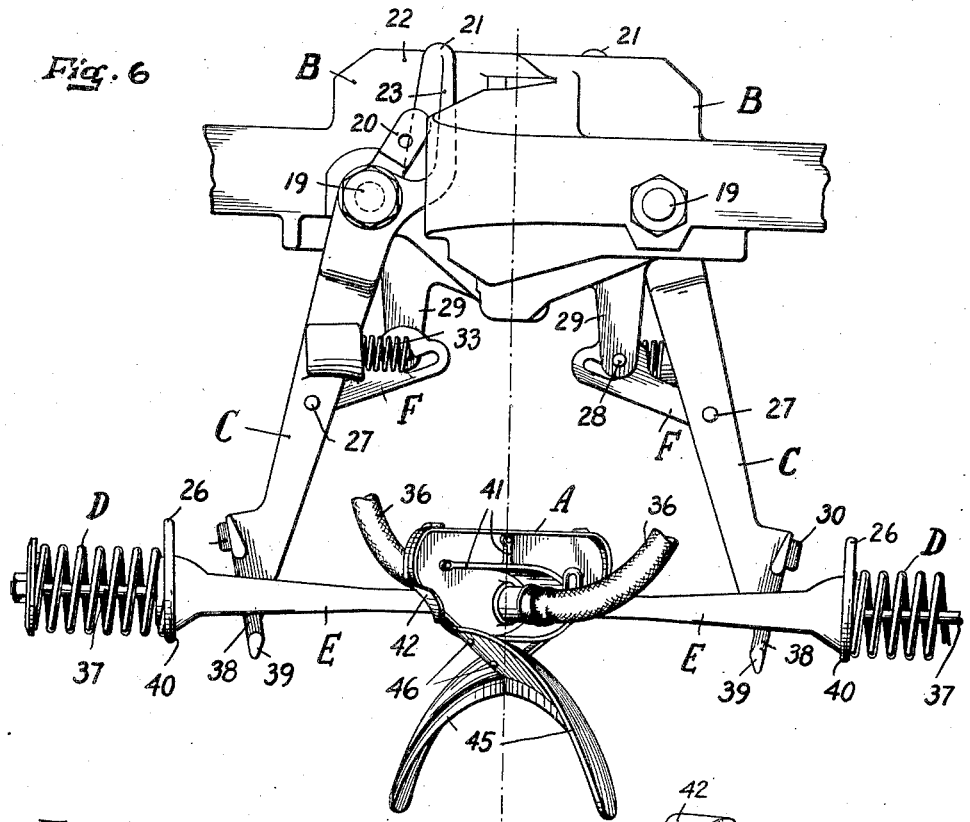
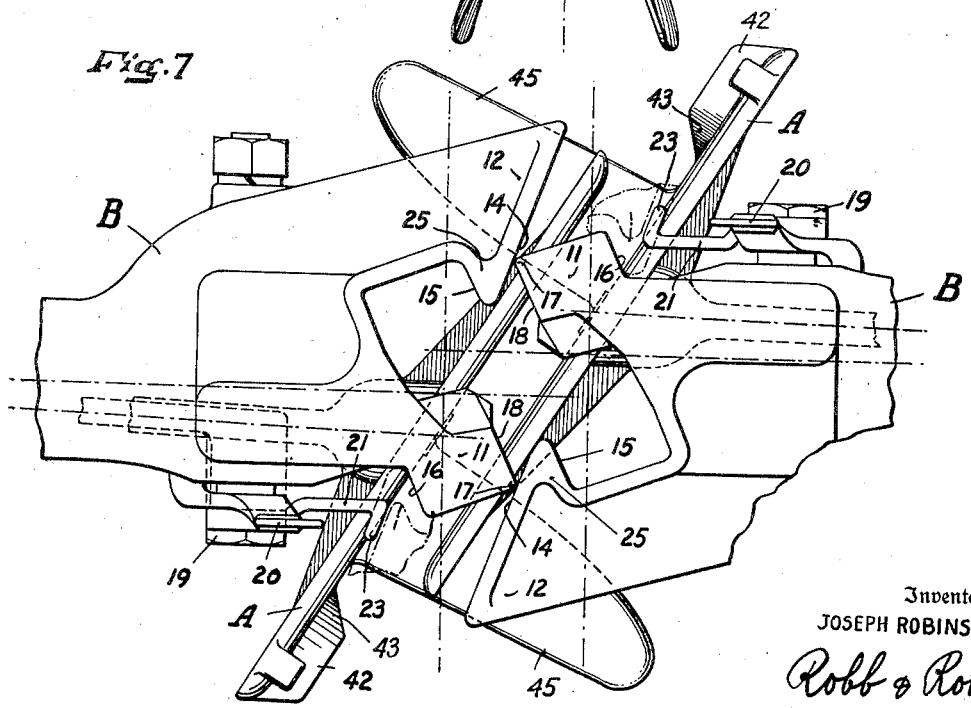
Inventor
JOSEPH ROBINSON
Robb & Robb
Attorneys Patented Jan. 28, 1941

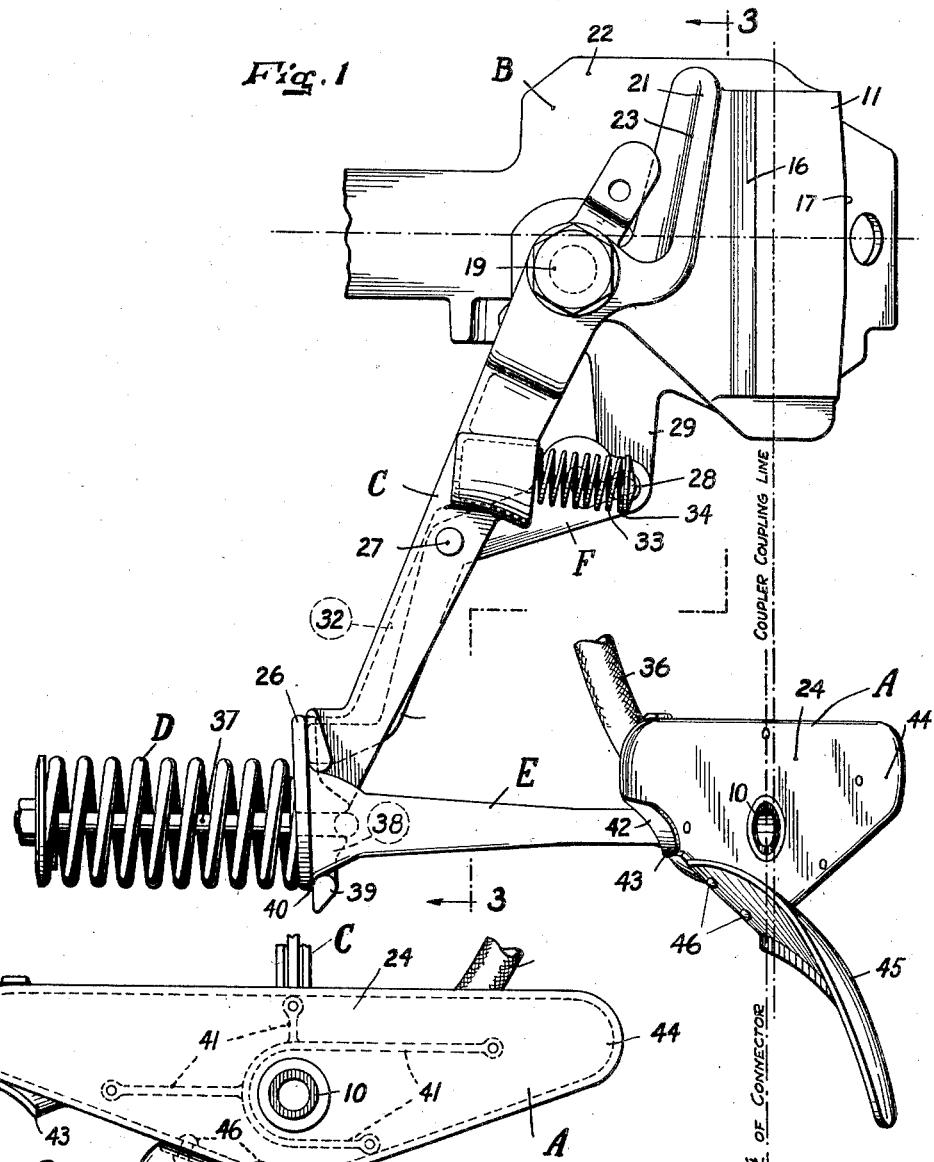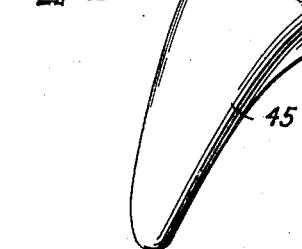

2,229,902

UNITED STATES PATENT OFFICE 2,229,902

AUTOMATIC TRAIN PIPE CONNECTOR AND CAR COUPLER SLACK CONTROL MEANS

Joseph Robinson, New York, N. Y., assignor of one-half to Roy M. Wolvin

Original application April 9, 1935, Serial No. 15,458. Divided and this application January 26, 1937, Serial No. 122,350

12 Claims. (Cl. 213—76)

This application is a division of my co-pending application Serial #15,458, filed April 9, 1935, issued as Patent No. 2,188,922. The invention it covers relates to "Automatic train pipe connectors" and car coupler slack control means of the type that is attached to the car coupler of railway cars, and has among its objects to provide improved means for yieldingly supporting the connector head at the limit of its maximum forward movement when coupled and for facilitating its coupling operation. This forward positioning is accomplished by novel spring actuated means, forming a part of my invention, which tend constantly to hold connected car couplers in the draft position and thereby remove or control the longitudinal slack now common between them, especially between car coupler heads of the Janney type.

Other objects and advantages of my invention will appear from the following description and in the accompanying drawings, in which—

Figure 1 is a side elevation of my improved connector head support or thrust means showing the parts in the normal uncoupled position;

Figure 2 is a front elevation of one form of my improved connector head, indicating in dotted lines one method of mounting the head on its support;

Figure 3 is a front elevation of the supporting or thrust means shown in Figure 1 taken at about the line 3—3 of that figure. In this view the car coupler head is omitted;

Figure 4 is a side elevation similar to Figure 1 showing my improved support or thrust device in the set-forward position in which the coupling face of the connector head has been shifted, by the coupling of the car couplers, from a position behind the coupling line of such couplers to a position considerably in advance of the coupling line. In this view only a fragmentary part of the mating coupler is shown, it being that portion thereof which engages the pivoted bracket in coupling;

Figure 5 is a front elevation of the car coupler shown in Figure 1, illustrating a modification of the support shown in Figures 1 and 4 wherein the support is pivoted on approximately the vertical centerline of the coupler and within the coupler head;

Figure 6 is a side elevation of a pair of connectors of the type shown in Figure 1, coupled. In this view the train pipe hose are omitted in part;

Figure 7 is a plan view showing a pair of couplers of the type illustrated in Figure 1 in the act of coupling, each of the couplers being provided with my improved coupler slack control device or connector support of the type shown in Figure 1.

Referring to the drawings: Heretofore the resilient force for pressing the connector head against a companion head has been produced by arranging the connector with respect to the car coupler so that its head is pushed rearwardly by a companion connector as mating couplers come together. Usually this force is a compression spring arranged in front of a stationary connector bracket or behind such bracket. Compression of the spring is produced by projecting the coupling head A of the connector a substantial distance in front of the coupling line of the car, that is to say, the pulling face of the car coupler. Under ordinary conditions this arrangement, in proper form, is satisfactory. But under conditions of great vertical and lateral variations in coupler heights, such as exist in some foreign countries, the arrangement meets with difficulties. These difficulties arise mainly from two causes. One is the projection of the coupling face of the connector head A in advance of the pulling face of the car coupler. Necessarily this projection is of considerable extent, it being equal to the compressional travel required in the connector spring to secure the sealing force desired on the connector head and gaskets. The other cause is that this projection brings the connectors into engagement prior to alignment and engagement of the car couplers. This in turn often means that the connectors must be self reliant and do all their own aligning, and that sometimes they must also, in part at least, align the car couplers.

These circumstances occasionally overburden the coupling capacity of the connectors, and result in coupling failures. Another fault of this type of connector support is that extreme vertical shifting of one car coupler relative to the other while coupled dissipates or spends the compression of the connector springs, reducing the spring force against the coupling heads A to a point where it is ineffectual or useless. Unless connectors having this type of support project much in advance of the car coupling line, with the attending objections noted, the connector heads will actually be drawn apart by excessive vertical shifting of one car coupler relative to the other when coupled.

These operating faults are not present in a connector support constructed according to this invention which, in the main, reverses the conventional action of connectors in coupling. It carries the connector so that the point at which the plane occupied by the coupling face of the head A intersects the axis of the connector gasket 10, lies behind instead of in front of the coupling line of the car coupler. This rearward position is of an extent that materially facilitates vertical coupling of the connector and throws upon the car coupler itself—Figure 7—practically all the work of aligning the connectors laterally. The arrangement includes means for automatically compensating for the loss of spring compression when one car coupler moves upwardly with respect to the other while coupled, and means which tend constantly to urge the interlocking parts of mated couplers into draft engagement to remove or control the free longitudinal slack between the couplers.

During the act of coupling, the connector heads of my invention are carried or thrown forward from a predetermined position behind the coupling line of the car couplers into liberal spring pressed engagement with each other—Figures 4 and 6. This is accomplished by means actuated by the car coupler during the final or other stages of the coupling operation. It will be understood that my improvement may be used with any type of car coupler having, or which may be provided with, suitable cooperative means. In the accompanying drawings I show a well known form of automatic vertical plane jaw coupler B of the Willison type having a forwardly projecting jaw 11 on one side and a recessed horn 12 on the other side adapted to engage a corresponding recess and projection of a counterpart or companion coupler on an adjacent car. In plan view, Figure 7, the horn is flared in opposite directions as at 14—15 to the general shape of the letter V. The inner or pulling surface 15 of the horn is adapted to drop behind and engage the complementary surface 16 on the jaw 11 of a companion coupler. Lateral alignment of the couplers in one direction is accomplished by engagement of the inclined surface 12 of the horn with the point or nose 17 (Figure 7) of the jaw, whilst lateral alignment of the couplers from the opposite direction is obtained by engagement of the flared faces 18 of the meeting jaws 11. A rugged pin 19 passes laterally through each coupler below its horizontal center line, and upon it is mounted the usual uncoupling member 20 for disengaging the couplers. My improved connector support includes a bracket or rocker arm C of suitable shape and construction, and suitably pivoted on or otherwise mounted with respect to the car coupler B. In the present embodiment of my improvement I show the bracket C pivotally mounted on the car coupler pin 19, the latter being sufficiently lengthened for the purpose. At its lower end the bracket suitably carries on the vertical centerline of the car coupler or offset or angled to either side thereof, any satisfactory automatic connector unit or assembly comprising generally a buffer spring D, the yoke E and the coupling head A, a suitable form of these parts being here shown and shown particularly in my co-pending applications Serial #741,987 and #8,092, filed August 29, 1934, and February 25, 1935 and issued as Patents Nos. 2,141,196 and 2,089,098 respectively. At its upper end the bracket is provided with a suitable buffing or thrust part 21 which is off-set inwardly toward the wall 22 of the car coupler, and is provided with a laterally extending wall 23, inclined complementarily to the surface 15 of horn 14, by which it is engaged in the final coupling stages of the car couplers.

In figures under description it will be observed that the point of intersection of the axis of the gasket 10 and the plane occupied by the vertical coupling face 24 of the connector head A, lies behind the coupling line (Figure 4) of the car couplers prior to the completion of the coupling act. This arrangement, as indicated in Figure 7, causes the couplers B to bring the connectors into practically full lateral engagement before the faces of the coupling heads A seat. In Figure 7 it will also be noted that only a part of one end of the connector heads A lie forward of the forwardmost part of the couplers, and that the flat faces of the connector heads will not seat until the car couplers enter the final coupling stage. The connector head A may, however, be positioned entirely behind the forwardmost part of the car couplers if desired, and this may be accomplished either by carrying the lower end of the bracket C rearwardly, by lessening the angle of the connector heads with respect to the longitudinal centerline of the connectors, or by angling the connectors in the opposite direction to that shown in Figure 7 with the vertical center of the gaskets 10, in their present position, at the axis or pivot point.

As the couplers pass through the final coupling stage the portion 25 of the horn 12 engages the upper end 21 of the bracket C and rocks or shifts it rearwardly on its pivot 19. This operation throws or carries the connector head A forward into engagement with its companion head whereupon the further forward movement of the lower end of the bracket compresses the buffer spring D, moving the flange 26 of the yoke E out of engagement with the back of the bracket, and releasing the connector head A from the supporting resistance of these parts to free universal movement on the bracket C. As aforesaid, the construction and action of these supporting parts is essentially the same as that of the similar parts shown in my co-pending application Serial #741,987, filed August 29, 1934, but supporting parts of different construction and operation may, of course, be used if desired. To free the upper end 21 of the bracket, and the portion 25 of the car coupler, from the force of the buffer spring D when the coupler slack is taken (that is to say, when the couplers are pulling), I provide a rugged dog or hook F suitably located and arranged on the bracket as by the pivot 27. When the bracket is rocked forward to the full coupling position this dog engages a suitable anchor or pin 28 arranged on a part 29 of the car coupler B, or otherwise placed thereon. As the dog or hook F drops into coupled position on the pin 28 the lower end 30 of the trigger arm 31 of the dog moves through an opening 32 formed in the bracket for this purpose directly in front of the flange 26. Obviously, when the connectors separate, the flange 26, moving up against the bracket under the full force of the buffer spring D, will engage the trigger lug 30 and rotate the dog F out of engagement with the pin 28. Thereupon gravity tends to return the connector, including its bracket C, to the normal uncoupled position shown in Figure 1. To assure that this return will be prompt, and to prevent the bracket oscillating on the pivot 19 while in the uncoupled position, I suitably mount a positioning spring 33, of any desired form, between the bracket and a spring seat 34 arranged on one end of the anchor device 28.

In Figure 6 a pair of connectors constructed according to my improvement are shown in the coupled position heretofore described, and in Figure 4 a connector having my improvement is shown thrown forward as occurs when a car not having my invention couples with one equipped with it. In this view the V shaped nose 25 of the coupler horn 12 is shown in vertical section and in the position which it, and the part 21, occupy when in the coupled position shown in Figure 6. As illustrated in Figure 4, these co-acting parts may include an alternate construction which consists in vertically curving the meeting faces of these parts complementarily to each other as at 35. This formation causes the bracket C to be progressively rocked forward at its bottom to further compress the buffer springs D and thus avoid loss of pressure on the connector heads A as the car couplers B move vertically relative to each other while coupled. The vertically inclined opening in the dog F in which the pin 28 is received is sufficiently wide to permit this forward movement of the bracket C. When the connector head A is in the elevated position shown in Figure 4, the train pipe hose 36 may be freely passed under the head, and its interchange member (part B, Figures 1 and 3 of my co-pending application Serial #15,458 filed April 9, 1935), may be easily connected into the hose coupling of the unequipped car. Thus my improved connector support also constitutes means for automatically shifting the connector out of the way for free interchange connection between the train pipe hose of an equipped car and the hose of a car not having the automatic connector. Obviously with the connector head elevated as in Figure 4 all danger of the chafing of the hose against the under side of the head is removed, especially with a coupling head A having the general V shape shown.

To increase the effectiveness of the buffer spring D in supporting the coupling head A against downward movement from the normal uncoupled position shown in Figure 1, the flange 26 is of considerable height, and the tie rod 37 is pivoted a considerable distance in front of the flange on the front face of a vertically straight anchor lug 38 on the bracket C. This increase in effective supporting power may be enhanced by forwardly offsetting the bottom 39 of the lug 38 and by extending the bottom 40 of the flange forwardly to meet it. In considering the arrangement of these parts it will be observed that the freer the coupling head A is of resistance of the spring D during upward movement the less will be the downward pull on the higher connector head. It is not necessary of course to support the connector head A on the bracket C by the means illustrated in any of these figures. Any suitable support, such as shown in Figures 9, 12, or 13 of my aforesaid co-pending application Serial #15,458 filed April 9, 1935, may be used, and the bracket C may be pivoted at any preferred place in its length to increase or decrease the throw of the bracket at its bottom, and accordingly vary the resistance of the buffer spring D to the coupling action of mating couplers B. The modification shown in Figure 5 pivots the bracket C on the pin 19 at approximately the vertical center of the coupler, and in the throat or shank of the latter. Nor is it essential that the coupling head A carried by my improved support shall be of the type shown in Figure 2. It may be of any described type. The coupling head illustrated in Figure 2 is essentially the same as the one shown in my co-pending applications Serial #8,092, filed February 25, 1935, and Serial #15,458, filed April 9, 1935. It is pressed of steel and riveted to webs or braces 41 of the yoke E. The lug or supplementary guide 42 curves downwardly at 43 to prevent fouling thereon of the end 44 of the coupling head A in coupling. The primary vertical gathering member 45 of the head may be of any shape best suited to the conditions involved, and may be formed integral with the head A, or separately thereof and suitably secured thereto as by rivets 46.

It will be noted that the upper ends 21 of the brackets C tend constantly, under the influence of the springs D, which may be of any desired power, to maintain the knuckles or horns 12 of opposing couplers in draft or pulling engagement with the jaws 11. The arrangement assures that the connector heads will generally rest at the limit of their forward movement when connected, and that the coupled car couplers will be constantly urged to the draft or pulling position. Thus, in addition to serving as an automatic connector support, my invention constitutes thrust means for controlling or removing slack between car couplers when coupled. It will be appreciated that the position of the pivot 19 and the spring D with respect to the horizontal center line of the coupler may be varied to best suit the results desired.

The terms and expressions which I have employed in this application are used as terms of description and not of limitation, and I have no intention, in the use of such terms and expressions, of excluding any equivalents of the features shown and described or portions thereof, but recognize that various modifications are possible within the scope of the invention claimed. The right is reserved to file an application or applications divisional hereof on any of the subject matter of this application which is not or may not be fully claimed herein.

What I claim is:

1. In combination, a pair of car couplers and automatic connectors operating in unison, said connectors being normally positioned rearwardly of full coupled positions, and means for causing mating car couplers to primarily align the connectors, said means including cooperating means on the couplers and on the connectors for moving the latter forward to the full coupled position as the couplers couple.

2. In combination, a pair of car couplers and a pair of automatic connectors, each of which comprises a coupling face, the coupling faces of the connectors being normally disposed behind the coupling line of the couplers, and cooperating means on said couplers for shifting said coupling faces of said connectors forward when mating couplers couple.

3. In combination, a pair of car couplers, a pair of automatic train pipe connectors shiftably supported on said couplers, each of said connectors comprising a coupling head normally lying behind the coupling line of its associated coupler, and means for shifting said heads forward when said couplers couple, each of said connectors including a buffer spring which is under greatest compression when said connectors are connected.

4. In combination, a car coupler, an automatic train pipe connector pivotally supported on said coupler and having a coupling head, and means operated by an opposing coupler for rocking said connector on said support to shift said coupling head forward when said coupler couples with an opposing coupler.

5. In combination, a car coupler, an automatic train pipe connector pivotally supported on said coupler with its longitudinal axis disposed in a substantially horizontal position, and having a coupling head and a train pipe hose, and means operated by an opposing coupler for rocking said connector on said support to automatically shift said coupling head to an elevated position substantially above its normal horizontal automatic coupling position and out of the way of free interchange connection between said hose and the hose of a car not equipped with said connector.

6. In combination, a car coupler adapted to couple automatically by impact, interlocking means on said coupler adapted to interlock with similar means on a companion coupler, and means for controlling the longitudinal free slack between said interlocking means of mated couplers, said controlling means comprising a vertically arranged resiliently actuated thrust member pivoted on one side of said coupler and movable relative thereto and adapted to engage a complementary portion of a mating coupler to hold said interlocking means in draft engagement, said controlling means serving also to hold an automatic connector at the limit of its forward movement.

7. In apparatus of the class described, a car coupler having interlocking means adapted to automatically couple with interlocking means of a mating coupler, automatic connector means operating in unison with the coupler and adapted to be connected with a mating connector means, and abutment means interposed between said coupler and connector means and pivotally mounted on said coupler for controlling the free slack between said interlocking means of mated couplers, said abutment means being rotated on its pivot and rendered effective responsive to interlocking engagement of mating couplers and coupling engagement of mating connectors.

8. In apparatus of the class described, a car coupler having interlocking means adapted to automatically couple with interlocking means of a mating coupler, automatic connector means operating in unison with the coupler and adapted to be connected with a mating connector means, and abutment means pivotally mounted on said coupler interposed between said coupler and connector means for controlling the free slack between said interlocking means of mated couplers, said abutment means being rendered effective responsive to interlocking engagement of mating couplers and coupling engagement of mating connectors, said abutment means being rendered ineffective responsive to uncoupling of mated couplers.

9. In apparatus of the class described, a car coupler having interlocking means adapted to automatically couple with interlocking means of a mating coupler, automatic connector means including yieldable buffer means operating in unison with the coupler and adapted to be connected with a mating connector means, and means interposed between said coupler and connector means for controlling the free slack between said interlocking means of mated couplers, said interposed means including an abutment member movably connected to the couplers and rendered effective responsive to interlocking engagement of mating couplers and coupling engagement of mating connectors.

10. In apparatus of the class described, a car coupler having interlocking means adapted to automatically couple with automatic means of a mating coupler, automatic connector means operating in unison with the coupler and adapted to be connected with a mating connector means, and abutment means movable relative to the coupler and carrying said connector means for urging said coupler to its draft position responsive to interlocking engagement of mated couplers and connector means, whereby to eliminate slack between couplers.

11. Apparatus as claimed in claim 10, wherein the abutment means for eliminating slack between couplers comprises a lever pivotally mounted on the coupler and having a portion extended to one side of its pivot for engagement with a mating coupler during coupling action, and having a portion extended to the opposite side of its pivot for supporting the connector means, and spring means coacting with the latter portion of the lever and with the connector means for applying a substantial pressure upon the connector means to urge the same into engagement with a mating connector during the coupling action aforesaid, thereby creating a reactive pressure which is transmitted through the pivotal lever to the coupler.

12. Apparatus as claimed in claim 10, wherein the abutment means for eliminating slack between couplers comprises a lever pivotally mounted on the coupler at one side thereof for pivotal movement in a substantially vertical plane, and said lever having a portion extended to one side of its pivot for engagement with a mating coupler during the coupling action, and having a portion extended to the opposite side of its pivot and below the coupler for supporting the connector means, and spring means coacting with the latter portion of the lever and with the connector means for applying a substantial pressure upon the connector means to urge the same into engagement with a mating connector during the coupling action aforesaid, thereby creating a reactive pressure which is transmitted through the pivotal lever to the coupler.

13. In apparatus of the class described, a car coupler, an automatic train pipe connector pivotally supported on said coupler with its longitudinal axis normally disposed in a substantially horizontal position, said connector having a coupling head and a train pipe hose, and means operable by a mating coupler for yieldably thrusting said connector towards a mating connector during coupling action, said last named means including means for positively maintaining said thrust means in a condition serving to continually urge the connector in an effectively connected position with a mating connector.

14. In apparatus of the class described, a car coupler, an automatic train pipe connector pivotally supported on said coupler with its longitudinal axis normally disposed in a substantially horizontal position, said connector having a coupling head and a train pipe hose, and means operable by a mating coupler for yieldably thrusting said connector towards a mating connector during coupling action, said last named means including a shiftable locking dog and coacting abutment means for positively and automatically maintaining said thrust means in a condition serving to continually urge the connector in an effectively connected position with a mating connector.

15. In apparatus of the class described, a car coupler, an automatic train pipe connector pivotally supported on said coupler with its longitudinal axis normally disposed in a substantially horizontal position, said connector having a coupling head and a train pipe hose, and means operable by a mating coupler for yieldably thrusting said connector towards a mating connector during coupling action, said last named means including a shiftable locking dog and coacting abutment means for positively and automatically maintaining said thrust means in a condition serving to continually urge the connector in an effectively connected position with a mating connector, and means operable responsive to uncoupling action of the coupler and connector for tripping said locking dog aforesaid so as to restore the connector and thrust means to their normal positions.

16. In apparatus of the class described, a car coupler, an automatic train pipe connector pivotally supported on said coupler with its longitudinal axis normally disposed in a substantially horizontal position, said connector having a coupling head and a train pipe hose, and means operable by a mating coupler for yieldably thrusting said connector towards a mating connector during coupling action, said last named means including a shiftable locking dog and coacting abutment means for positively and automatically maintaining said thrust means in a condition serving to continually urge the connector in an effectively connected position with a mating connector, and trigger means operatively connected with the locking dog and operable responsive to uncoupling action of the coupler and connector for tripping said locking dog aforesaid so as to restore the connector and thrust means to their normal positions.

17. In apparatus of the class described, a car coupler, an automatic train pipe connector pivotally supported on said coupler with its longitudinal axis normally disposed in a substantially horizontal position, said connector having a coupling head and a train pipe hose, means operable by a mating coupler for yieldably thrusting said connector towards a mating connector during coupling action, said last named means including means for positively maintaining said thrust means in a condition serving to continually urge the connector in an effectively connected position with a mating connector, and means operable responsive to uncoupling action for rendering said thrust maintaining means ineffective.

18. In combination, a pair of car couplers and a pair of automatic connectors operating in unison, means for placing the connectors under coupling pressure and for preventing diminution of such pressure when one of the coupled couplers shifts vertically relative to the other, said means including a pair of abutment members movably connected with said couplers and said connectors and adapted to move relative to the couplers to impart lineal movement to the connectors as the couplers interlock and when one coupler shifts vertically with respect to the other after the couplers have interlocked.

JOSEPH ROBINSON.